United States Patent [19]
Ogata et al.

[11] Patent Number: 5,087,936
[45] Date of Patent: Feb. 11, 1992

[54] CAMERA

[75] Inventors: Kazutsugu Ogata; Kazuhisa Seki; Kouji Kaneko; Satoshi Mikajiri, all of Omiya; Kiyotaka Kaneko; Masanori Yoshida, both of Tokyo, all of Japan

[73] Assignee: Fuji Photo Film Co., Ltd., Kanagawa, Japan

[21] Appl. No.: 403,356

[22] Filed: Sep. 6, 1989

[30] Foreign Application Priority Data

Sep. 8, 1988 [JP] Japan .................................. 63-223604
Sep. 8, 1988 [JP] Japan .................................. 63-223605

[51] Int. Cl.$^5$ ............................................... G03B 7/08
[52] U.S. Cl. ....................................... 354/430; 358/29; 358/213.19
[58] Field of Search ................. 354/430, 127.1, 482; 358/29, 213.19; 356/221, 222, 225, 226, 218; 250/214 D

[56] References Cited

U.S. PATENT DOCUMENTS 4,595,946  6/1986  Uehara et al. .................... 358/29 C
4,774,588  9/1988  Noda et al. ...................... 358/213.19

OTHER PUBLICATIONS

"Fundamentals of Physics", Halliday and Resnick, New York, 1981, p. 324.
"Communications Systems-An Introduction to Signals and Noise in Electrical Communication", Carlson, New York, 1988 pp. 345-347.
"Electronic Engineer's Handbook", Fifth Edition, Section 31/8-31/11, Section 36/1-36/18 and 37/1, Mazda et al.

Primary Examiner—W. B. Perkey
Assistant Examiner—Cassandra C. Spyrou

[57] ABSTRACT

A filter is provided which can pass therethrough only a signal component having a frequency corresponding to a secondary higher harmonic frequency component (200-240 Hz) of the fluorescent light of the output signal from a light-receiving element for receiving incident light thereto from the photograph area. Based on the signal which is passed through the filter, it is detected whether the photography area is illuminated with the fluorescent light. Since the color temperatures of sunlight (outdoors in fine weather) and fluorescent light show substantially the same value, it is difficult to distinguish two kinds of above light sources. A ripple period of the fluorescent light and the like is measured, and the output signal of a light detecting device (e.g., a color temperature sensor, photometry element, and so forth) is sampled at a plurality of times in a length of time equivalent to one period of the measured ripple period. Therefore, even for a photograph under artificial light which includes ripple components, an average of the quantity of the incident light can be detected and the white balance adjustment and the exposure control can be appropriately conducted. As a result, it is possible to distinguish between sunlight and fluorescent light and an accurate white balance adjustment can be made and the color reproducibility can be greatly improved even under fluorescent light.

5 Claims, 3 Drawing Sheets

CAMERA

BACKGROUND OF THE INVENTION

1 Field of Invention

This invention relates to a camera, and in particular, to a camera (inclusive of a movie video camera and a still video camera) which is required to adjust a white balance of video signals representing an image of a subject and a camera which senses light from the outside thereof and provides various controls based on the sensed light.

2 Description of the Related Art

Since a video camera is adapted to process color video signals, it is required to adjust a white balance of chrominance signals. Conventional video cameras are equipped with a color temperature sensor for measuring the color temperature of illuminating light inclusive of sunlight such that a white balance adjustment is carried out depending on the color temperature sensed by the sensor.

The color temperature sensor senses red and blue components of light incident thereto and measures the color temperature of incident light by computing the ratio of quantity of light between these two components. In a case where the incident light is natural light, since the color temperature can be sensed so as to obtain a relatively correct result, a satisfactory reproduction of the color of the subject may thereby be achieved. However, when sensing red and blue components of incident light, the color temperatures of sunlight (outdoors in fine weather) and fluorescent light (particularly daylight-cool white fluorescent lamp) sensed by the color temperature sensor show substantially the same value. Consequently, it is difficult to correctly distinguish between the sunlight and fluorescent light. As a result, in the case where the photograph is taken under fluorescent light, there arises a problem for a satisfactory reproduction of the color of a subject to.

On the other hand, in a camera having an automatic exposure control function, a quantity of incident light (luminance of a subject) is measured by a photometry element, and an exposure value is determined based on the measured quantity of incident light. As described above, in the camera adapted to process color video signals, it is required to adjust the white balance of chrominance signals. In order to adjust the white balance, the color temperature is sensed by the color temperature sensor.

In a camera system in which signals detected by the photometry element or color temperature sensor are sampled over a number of times at a fixed period or at a predetermined interval so as to be supplied to a control device (e.g., a CPU such as a microprocessor), the following problems arise in relation to artificial light. That is, the incandescent electric light and fluorescent light include ripple components of which the frequency is two or four times as high as that of the commercial frequency, so that depending on the sampling period and sampling time zone, only bright parts or dark parts are sampled and hence an average quantity of incident light cannot be obtained.

SUMMARY OF THE INVENTION

It is therefore an object of the present invention to provide a camera capable of detecting that a photograph is being taken under fluorescent light.

Another object of the present invention is to provide a camera capable of measuring an average quantity of incident light even if a photograph is being taken under artificial light including ripple components.

The camera according to the present invention includes a light-receiving element for receiving incident light thereon and for outputting a signal representing a quantity of the incident light, a band-pass filter for passing therethrough only a signal component having a frequency corresponding to secondary higher harmonic component of the fluorescent light of the output signal from the light-receiving element, and detecting means for detecting whether or not the incident light is supplied from a fluorescent lamp based on the signal which is passed through the band-pass filter.

In accordance with the present invention, the camera has the band-pass filter for passing only a signal component having the frequency corresponding to the secondary higher harmonic component of the output signal from the light-receiving element for receiving incident light thereto and outputting a signal representing the quantity of incident light. As a consequence, it is possible to determine the presence or absence of incident light including fluorescent light by detecting the frequency of the signal which passes through the band-pass filter. Since the secondary higher harmonic signal component of the ripple components of fluorescent light is detected as described above, it is possible to distinguish fluorescent light from incandescent light including almost only primary higher harmonic components of higher harmonics.

Consequently, since the existence of fluorescent light can be thus detected, it can be judged whether a photograph is being taken under sunlight or fluorescent light, even in a case where the color tempuretures of sunlight and fluorescent light are almost the same and where the judgement cannot be conducted depending on color temperatures. Therefore, the white balance adjustment suitable for each light can be achieved based on this judgement, and the color reproducibility becomes considerably improved, even if a photograph is taken under not only sunlight but also fluorescent light.

Furthermore, the camera of the invention includes ripple frequency measuring means for measuring a ripple frequency of artificial light, a sampling circuit for sampling detected signals from a light detecting device at a given period, and control means for controlling a sampling period of the sampling circuit in such a manner that the sampling circuit conducts a plurality of sampling operations in a length of time equivalent to one period of the ripple period measured by the ripple frequency measuring means.

The light detecting device here includes a photometry element for an automatic exposure control, a color sensor for white balance adjustment and so forth. In accordance with the present invention, the ripple frequency of artificial light is measured and the detected signal from a light detecting device is sampled at a plurality of times in a length of time equivalent to one period of the measured ripple period. Therefore, the sampling can be made at balanced points of time, which are not adversely shifted to the points of time corresponding to bright parts or dark parts of artificial light. Accordingly, by calculating an average of sampling data read in, an average quantity of incident light can be detected, and an automatic exposure control and white balance adjustment can be appropriately conducted.

A description will be given of an embodiment in which the invention is applied to a still video camera having both a photometry element and a color sensor. However, the present invention can also be applied to a movie video camera or an ordinary camera using a silver-halide photographic film and having a photometry element but does not include a color sensor. Furthermore, in the following embodiment, a ripple frequency of fluorescent light is measured by cutting off incandescent light by use of the band-pass filter. In the present invention, however, it may be possible that a ripple frequency of incandescent light is detected such that a sampling period is controlled based on this ripple frequency.

Other features and advantages of the present invention will be apparent from the following description taken in conjunction with the accompanying drawings.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 2a, 2b, 3a and 3b are various waveforms illustrating each part of the circuit in FIG. 1, in which FIGS. 2a and 2b show waveforms under fluorescent light and FIGS. 3a and 3b illustrate waveforms under incandescent light;

DESCRIPTION OF THE PREFERRED EMBODIMENTS

Figure 1:
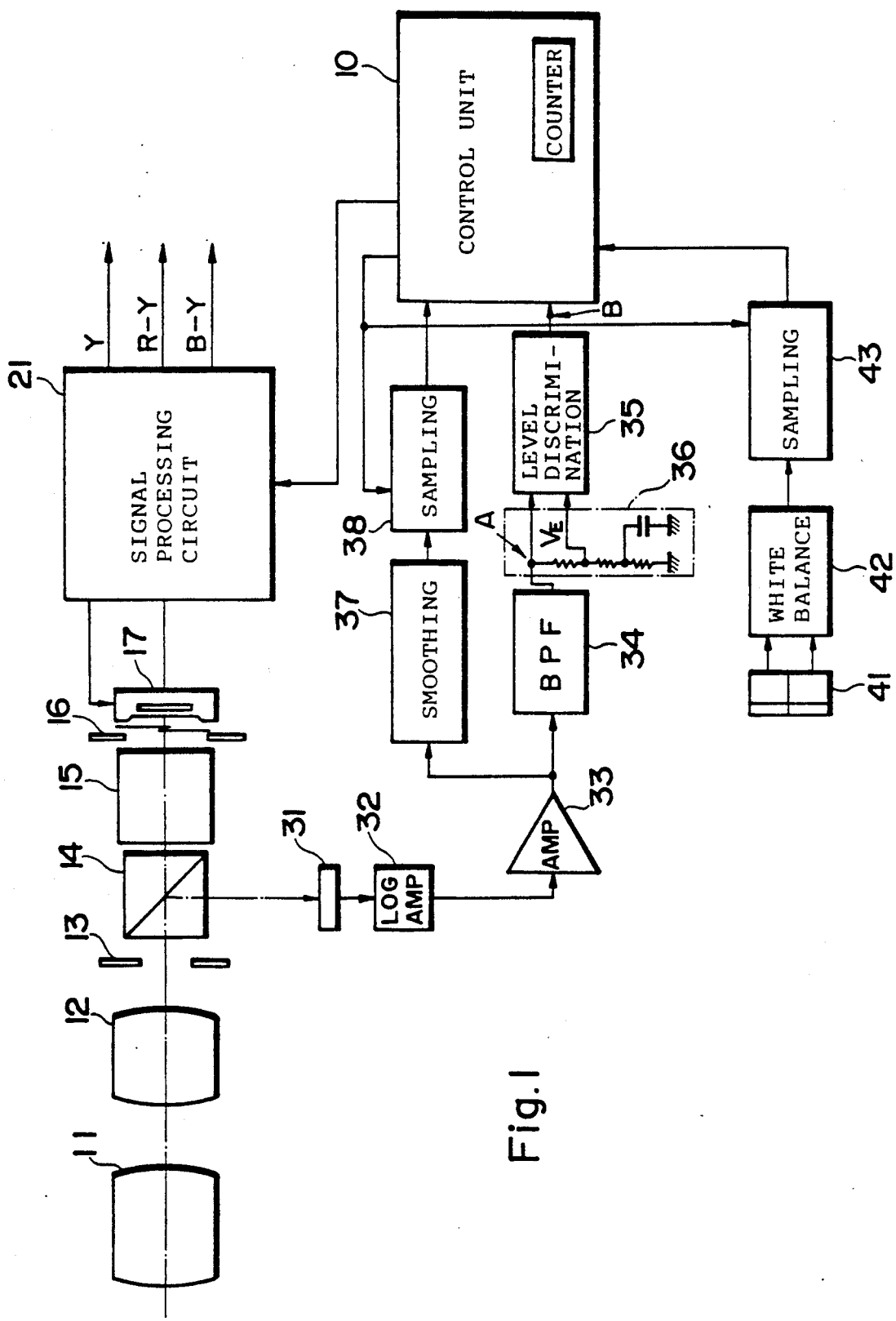
FIG. 1 is a block diagram illustrating part of the electrical construction of a still video camera according to an embodiment of the present invention.
Figure 3A:
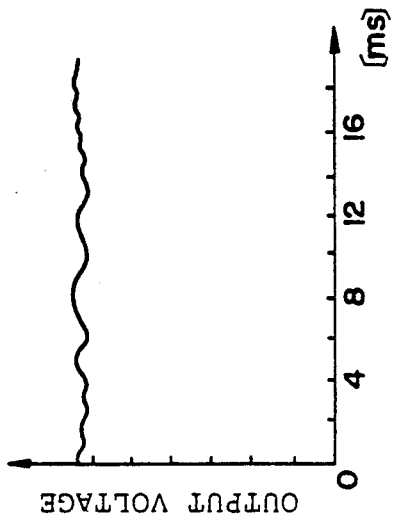
Figure 3B:
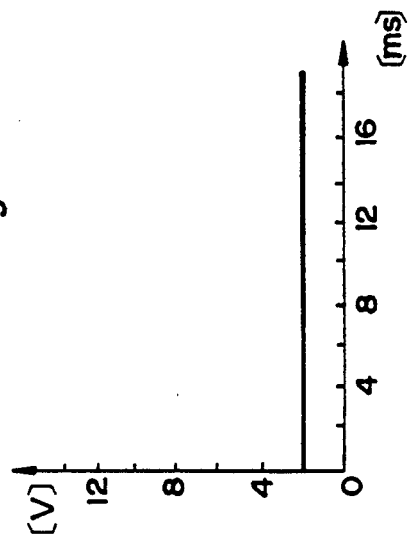
Figure 2A:
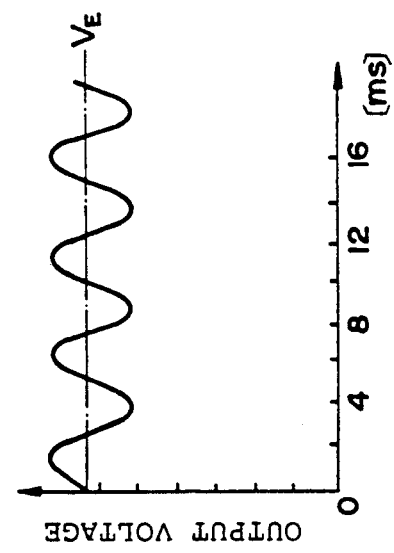
Figure 2B:
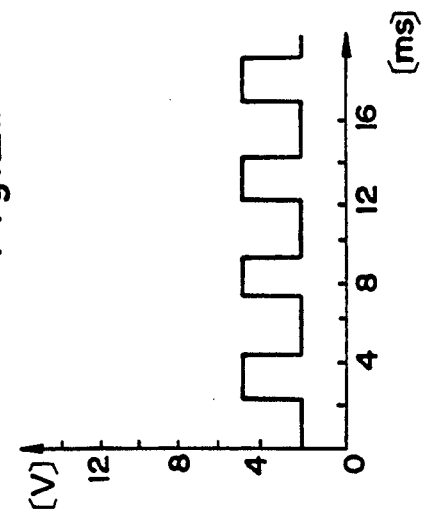

FIG. 1 is a block diagram illustrating a portion of the electrical construction of a still video camera (an electronic still camera) according to the present invention. FIGS. 2a to 3b illustrate various waveforms of respective parts of the circuit in FIG. 1. FIGS. 2a and 2b illustrate waveforms under the illumination by fluorescent light, whereas FIGS. 3a and 3b illustrate waveforms under the illumination by incandescent light.

At least the shooting operation of the still video camera is controlled by a control unit 10. The control unit 10 has a CPU (e.g., a microprocessor) including a memory (RAM, ROM, or the like) for storing programs to be executed by the CPU as well as required data and a required interface circuit. The control unit 10 includes a counter for measuring a ripple frequency (period) of the fluorescent light, which will be described later.

An imaging optical system includes a zoom lens system 11, an imaging lens system 12 for forming the image of a subject, a diaphragm 13, a beam splitter for deflecting a part of incident light in order to lead the part to a photometry element 31, an infrared rays cutoff filter 15, and an optical shutter 16.

A subject luminance detection signal outputted from a photometry element 31 is inputted to an amplifier circuit 33 via a logarithmic amplifier circuit 32. Further, this luminance signal is smoothed by a smoothing circuit 37 and is then applied to a sampling circuit 38. The sampling circuit 38 samples the input signal in response to sample-timing signals supplied from the control unit 10, which will be described hereinbelow.

Figure 4:
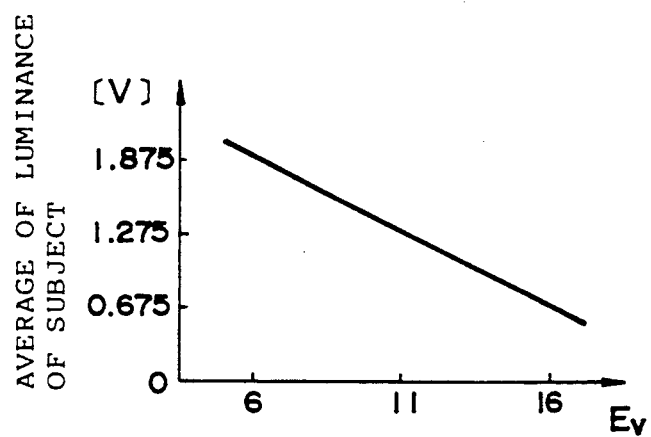
FIG. 4 is a graph illustrating the relationship between a signal from a photometry element and an exposure value Ev.

The sampled data of the luminance detection signal is applied to the control unit 10, which computes an average of a predetermined number of sampled data items inputted thereto and determines an exposure value Ev based on the average of the sampled data of a graph stored in the memory as illustrated in FIG. 4 or a table. Furthermore, the control unit 10 carries out processing for computing a diaphragm value and a shutter speed based on the exposure value Ev by a program diagram, processing for controlling the diaphragm 13 depending on the computed diaphragm value and processing for an open-close control of the shutter 16 based on the computed shutter speed.

On the other hand, the luminance detection signal from the photometry element 31 is also applied to a band-pass filter 34 in order to detect a ripple of fluorescent light, which will be described hereinbelow.

A color detection signal sensed by a color sensor 41 undergoes a predetermined processing in a white balance processing circuit 42, and then is supplied to the sampling circuit 43. The sampling circuit 43, in the same manner as for sampling circuit 38, samples the color temperature signal in response to sampling pulses supplied thereto from the control unit 10. Based on the sampled data of the color temperature signal sampled at a predetermined number of times, the average of the color temperature signals is then computed by the control unit 10. This average of the color temperatures is used for an amplifier gain control of red (R), green (G) and blue (B) signals (white balance control) in a variable-gain amplifier circuit of a signal processing circuit 21.

A solid state imaging device 17 for the three primary colors having a two-dimensional imaging cell array such as a CCD is arranged in the focal plane of the optical system. The imaged data which have been stored when the shutter 16 is opened in the imaging device 17 is read therefrom in the form of a serial video signal (R, G and B) in synchronization with horizontal and vertical synchronizing signals and is inputted to the signal processing circuit 21.

The signal processing circuit 21 has a preamplifier circuit for amplifying the still video signals (R, G and B) supplied thereto, the above mentioned variable-gain amplifier circuit (white balance adjustment circuit) and a process matrix circuit. The compounding ratio of R, G and B components of the still video signals (R, G and B) inputted to the variable-gain amplifier circuit is then adjusted based on the average of the color temperature signals by the variable-gain amplifier circuit under control of the control unit 10. A process matrix circuit is adapted to produce a luminance signal Y and two color difference signals R-Y and B-Y. These color difference signals R-Y and B-Y are line sequenced. The two color difference signals and the luminance signal Y are respectively frequency-modulated and are then mixed, and the resultant signals are magnetically recorded on a video floppy disc (not shown) by use of a magnetic head.

Figure 5:
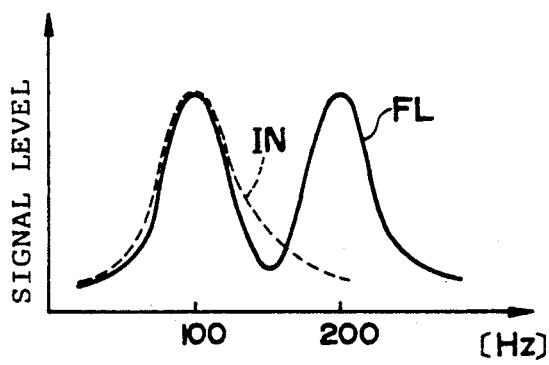
FIG. 5 is a graph illustrating a ripple frequency spectrum of fluorescent light and incandescent light.

Detecting of the ripple of fluorescent light is achieved by the band-pass filter (BPF) 34 and a level discriminating circuit 35. The ripple components exist in not only the fluorescent light but also in an incandescent light. The band-pass filter 34 is provided for cutting off the ripple components of incandescent light and for detecting only the ripple components of fluorescent light. In FIG. 5, the light and shade frequency (ripple frequency) spectrum of fluorescent light is illustrated by a continuous line FL and the ripple frequency spectrum of incandescent light is illustrated by a broken line IN, each of which represents a spectrum developed under the condition where the lamps are driven by a commercial frequency of 50 Hz. The light from an incandescent lamp includes only the ripple components having a frequency centered about 100 Hz. Subsequently, since the light from a fluorescent lamp includes the ripple components having the frequency of 200 Hz as a secondary higher harmonic in addition to 100 Hz, fluorescent light can be distinguished from incandescent light based on the secondary higher harmonic components which are characteristic of the fluorescent light. In a case where a fluorescent lamp is driven by a power source having a frequency of 60 Hz, the frequency spectrum having peak frequency values of 120 Hz and 240 Hz respectively are obtained. For incandescent light, the frequency spectrum having only a peak frequency 120 Hz is obtained, when an incandescent lamp is driven by the same power source.

The band-pass filter 34 has a pass-band with a center frequency of 220 Hz which is a centered in a range between 200 Hz and 240 Hz. An example of output signal waveforms of this filter 34 is illustrated in FIG. 2a and FIG. 3a. FIG. 2a illustrates the output signal waveform under the illumination of fluorescent light, and FIG. 3a illustrates the output signal waveform under incandescent light. Since the filter 34 is adapted to pass only signal components having a frequency near 220 Hz (a secondary higher harmonic) which is characteristic of fluorescent light, the ripple components of incandescent light are cut off by this filter 34, namely, only under the illumination by fluorescent light, the output signal A having the ripple component is obtained by the filter 34.

The output signal A from the filter 34 is delivered to a reference voltage generating circuit 36 as well as the level discriminating circuit 35. The circuit 36 has a capacitor for smoothing the signal A and a resistor circuit for dividing the potential of the signal A so as to generate a reference voltage $V_E$ having a level around the middle of the ripple components as illustrated in FIG. 2a and to deliver this reference voltage to the level discriminating circuit 35. The level discriminating circuit 35 discriminates the signal A inputted thereto by the reference voltage $V_E$ so as to output a square wave signal or a pulse signal B as illustrated in FIG. 2b. With regard to the incandescent light, no square wave components are included in an output signal B from the level discriminating circuit 35 as illustrated in FIG. 3b.

The output signal B from the level discriminating circuit 35 is inputted to the control unit 10. The control unit 10 counts the leading edges (or the trailing edges) of the signal B inputted thereto by the counter, measures the frequency of the signal B, namely, the ripple frequency (i.e., the secondary higher harmonic) of incident light, and computes the ripple period based on this frequency.

The measured result of the ripple frequency or the ripple period has two meanings and has two uses.

The first use is to judge whether or not a photograph is being taken under fluorescent light. When the measured ripple frequency is about 200 Hz, 240 Hz or the like, the control unit 10 assumes that a photograph is being taken under fluorescent light. As described above, since the color temperature of an image of a subject produced by the white balance processing circuit 42 shows almost the same value between sunlight and daylight-coolwhite fluorescent light, it is difficult to distinguish the two lights. Nevertheless, if the white balance adjustment is performed without distinguishing between sunlight and fluorescent light, a high amount of color reproducibility cannot be expected. Therefore, when the measured color temperature is sunlight or daylight-coolwhite fluorescent light, the control unit 10 determines a kind of light under which a photograph is being taken depending on the measured result of a frequency of the signal B. Under sunlight, the signal B appears as a constant level and does not include a square wave. The control unit 10 supplies the gain corresponding to sunlight or daylight-coolwhite fluorescent light to the variable gain amplifier circuit in accordance with the result of the judgement, and performs the white balance adjustment. As a result, it is possible to make an accurate white balance adjustment even under fluorescent light.

Incidentally, among the kinds of the fluorescent lamps, for instance, a daylight-coolwhite fluorescent lamp, daylight fluorescent lamp and coolwhite fluorescent lamp, it is possible to distinguish among these camps based on the measured color temperature so that the white balance adjustment is made corresponding to each kind of fluorescent light.

The other use is to control the sampling circuits 38 and 43 based on the measured ripple period. In the case where the measured frequency of the signal B is about 200 Hz, the fluorescent lamp is being driven by a commercial power having a frequency of 50 Hz. Since the main ripple frequency (the primary higher harmonic) of this fluorescent lamp is about 100 Hz, the period of this ripple is 10 ms.

Consequently, in this embodiment, eight sampling pulses are outputted for 10 ms (one period), the luminance and the color temperature of a subject are sampled at sampling intervals of 10/8 ms. In the case where the measured frequency of the signal B is about 240 Hz, the fluorescent lamp is being driven by a commercial power having a frequency of 60 Hz. Therefore, eight sampling pulses are outputted from the control unit 10 for 1000/120 ms (about 8 ms), and the sampling circuits 38 and 43 are operated in response to such sampling pulses.

Subsequently, since the sampling is carried out eight times within one period of the main ripple of fluorescent light, even if the photograph is being taken under fluorescent light, the data read in by the sampling operation is not emphasized by the light or shade parts of the ripple, and an average data can be obtained. As a result, an accurate white balance adjustment and exposure control can be made.

In a case where the photograph is not being taken under fluorescent light, the sampling is conducted at a reasonable fixed sampling period.

While the invention has been particularly shown and described in reference to presented embodiments thereof, it will be understood by those skilled in the art that changes in form and details may be made therein without departing from the spirit and scope of the invention.

What is claimed is:

1. A camera comprising:
   a light-receiving element for receiving incident light thereto and for outputting an output signal representing a quantity of said incident light;

a band-pass filter for passing therethrough only a signal component having a frequency corresponding to a secondary higher harmonic component of fluorescent light in response to said output signal from said light-receiving element when said incident light is fluorescent light; and detecting means for detecting whether said incident light is fluorescent light based on whether said signal component having said frequency corresponding to said secondary higher harmonic component of fluorescent light is passed through said band-pass filter.

2. The camera according to claim 1, further comprising:

ripple period measuring means for measuring a ripple period of said signal component output of said bandpass filter;

sampling means for sampling said output signal of said light-receiving element at a predetermined period; and control means for controlling said predetermined period of said sampling means in such a manner that said sampling means effects a plurality of sampling operations in a length of time equivalent to one period of said ripple period measured by said ripple period measuring means.

3. A camera comprising:

a light detecting device for receiving incident light to generate a detected signal;

ripple period measuring means for measuring a ripple period of said detected signal, said ripple period occurring when said incident light is artificial light;

sampling means for sampling said detected signal output from said light detecting device, said sampling occurring at a predetermined period; and control means for controlling said predetermined period of said sampling means in such a manner that said sampling means effects a plurality of sampling operations in a length of time equivalent to one period of said ripple period measured by said ripple period measuring means.

4. A method for detecting incident light received by a camera, comprising the steps of:

(a) receiving the incident light in a light receiving element;

(b) outputting an output signal representing a quantity of the incident light received in said step (a);

(c) passing only a signal component having a frequency corresponding to a secondary higher harmonic component of fluorescent light through band-pass filter means in response to the output signal outputted at said step (b) when the incident light is fluorescent light; and (d) detecting whether the incident light is fluorescent light based on whether the signal component having the frequency corresponding to the secondary higher harmonic component of fluorescent light is passed through said step (c).

5. A method according to claim 4, further comprising the steps of:

(e) measuring a ripple period of the signal component output the band-pass filter means in ripple period measuring means;

(f) sampling in sampling means said output signal, outputted at said step (b), at a predetermined period; and (g) controlling the predetermined period of said step (f) so that a plurality of sampling operations are effected in a length of time equivalent to one period of the ripple period measured at said (e).

* * * * *